(12) United States Patent
Betz

(10) Patent No.: US 10,072,958 B2
(45) Date of Patent: Sep. 11, 2018

(54) TUBE FOR MEASURING THE DIFFERENTIAL PRESSURE OF A MEDIUM FLOWING THROUGH THE TUBE

(71) Applicant: SYSTEC CONTROLS MESS-UND REGELTECHNIK GMBH, Puchheim (DE)

(72) Inventor: Oliver Betz, Groebenzell (DE)

(73) Assignee: systec Controls Mess-und Regeltechnik GmbH, Puchheim (DE)

( * ) Notice: Subject to any disclaimer, the term of this patent is extended or adjusted under 35 U.S.C. 154(b) by 0 days.

(21) Appl. No.: 15/507,837

(22) PCT Filed: Sep. 9, 2015

(86) PCT No.: PCT/EP2015/070570
§ 371 (c)(1),
(2) Date: Mar. 1, 2017

(87) PCT Pub. No.: WO2016/038073
PCT Pub. Date: Mar. 17, 2016

(65) Prior Publication Data
US 2017/0254684 A1    Sep. 7, 2017

(30) Foreign Application Priority Data

Sep. 12, 2014 (DE) .................. 10 2014 013 242
Oct. 14, 2014 (DE) .................. 10 2014 114 891
Oct. 21, 2014 (DE) .................. 10 2014 115 289

(51) Int. Cl.
*G01F 1/64* (2006.01)
*G01F 1/44* (2006.01)

(52) U.S. Cl.
CPC .................................. *G01F 1/44* (2013.01)

(58) Field of Classification Search
CPC ..... G01F 1/44; G01F 1/40; G01F 1/36; G01F 1/42
See application file for complete search history.

(56) References Cited

U.S. PATENT DOCUMENTS

| | | | |
|---|---|---|---|
| 1,366,522 A | 1/1921 | Crowell, Jr. | |
| 2,872,810 A | 2/1959 | Shaffer | |
| 3,680,376 A | 8/1972 | Catheron | |
| 6,339,963 B1 | 1/2002 | Torkildsen | |
| 7,610,817 B2 * | 11/2009 | Igarashi | F15D 1/00 73/861.52 |
| 7,610,818 B2 * | 11/2009 | Sanders | G01F 1/44 73/861.63 |
| 8,061,219 B2 * | 11/2011 | Rezgui | G01F 1/44 73/861.63 |
| 8,683,875 B2 * | 4/2014 | Lawrence | G01F 1/40 73/861.65 |

(Continued)

FOREIGN PATENT DOCUMENTS

| | | |
|---|---|---|
| DE | 1007512 B | 5/1957 |
| DE | 10046618 A1 | 4/2002 |

(Continued)

*Primary Examiner* — Jewel V Dowtin
(74) *Attorney, Agent, or Firm* — Laurence A. Greenberg; Werner H. Stemer; Ralph E. Locher

(57) ABSTRACT

A tube measures the differential pressure of a medium flowing through the tube. An insertion element for a tube as well as a method for assembling the insertion element and the tube are also provided.

13 Claims, 1 Drawing Sheet

(56) References Cited

U.S. PATENT DOCUMENTS

2004/0194554 A1    10/2004   Nestle et al.
2011/0132104 A1    6/2011   Benson et al.

FOREIGN PATENT DOCUMENTS

| | | |
|---|---|---|
| DE | 20305230 U1 | 6/2003 |
| EP | 0923711 A1 | 6/1999 |
| GB | 2412152 A | 9/2005 |
| WO | 2005088263 A1 | 9/2005 |

* cited by examiner

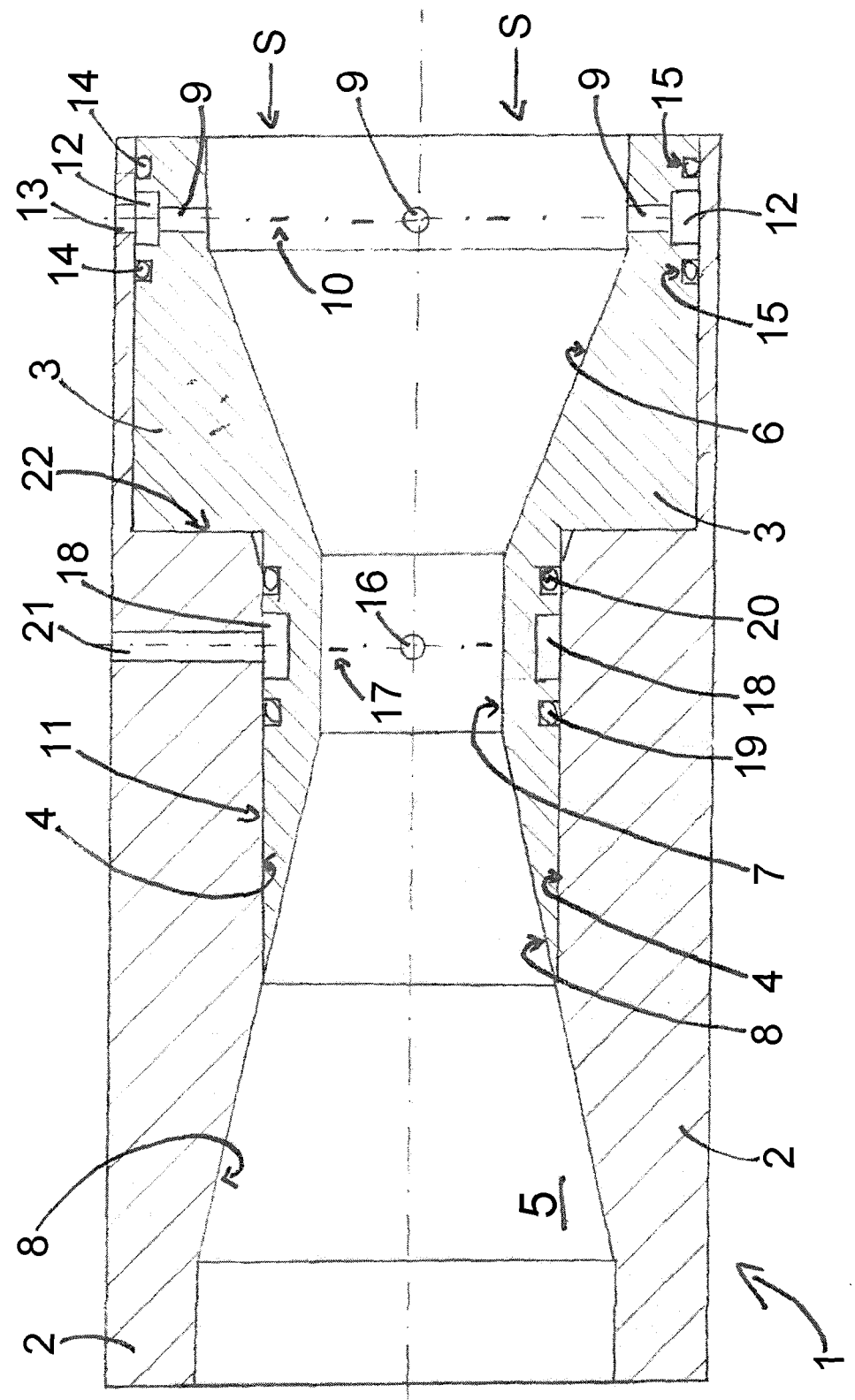

TUBE FOR MEASURING THE DIFFERENTIAL PRESSURE OF A MEDIUM FLOWING THROUGH THE TUBE

BACKGROUND OF THE INVENTION

Field of the Invention

The invention relates to a tube for measuring the differential pressure of a medium flowing through the tube. In addition, the invention relates to an insertion element for a tube according to the invention, as well as to a method for assembling the insertion element and tube.

The profiles and diameters of differential pressure gauges differ significantly depending on the medium and flow rate. Various forms that are conventionally flanged into the piping as a spacer are used. For example, the inserted spacers can be designed to resemble nozzles or encompass diaphragms that are placed into the tube carrying the flow of medium transverse to the direction of flow. As a consequence, a plurality of differential pressure gauges is known, whose respective configuration has been optimized for a special area of application. The disadvantage here is that, as a result of this plurality of possible shapes, the respective pipes are complicated individual fabrications or can only be fabricated in small batches.

SUMMARY OF THE INVENTION

The object of the invention is to propose a tube for measuring a differential pressure of a medium flowing through it that can be better standardized and more easily manufactured.

This object is achieved with a tube according to the invention. According to the invention, the tube encompasses a tubular carrier and a tubular insertion element, wherein the insertion element is arranged on the inner wall of the carrier, and wherein the insertion element comprises at least partial regions of an inner profile of the tube. Therefore, an underlying idea of the invention involves dividing up the tube used for differential pressure measurement into an outer part acting as the carrier and an insertion element or inlay that forms at least partial regions of the profile. This enables an extensive standardization of the carrier. Adjustment to the respective medium and its flow rate only requires that an insertion element optimized for this purpose be placed in the carrier. It is especially advantageous that the diameter of the insertion element and its progression can be quasi-freely selected. This means that it can be adjusted to the flow to be expected in the tube, specifically in such a way that a sufficient differential pressure can be measured for this flow. As a result, the tube can be better calibrated for its area of application. Tubular in the sense of the application does not necessarily refer to circular tubes. In principle, the invention is very generally suitable for tubes. The term tubular thus encompasses other tube shapes.

It here makes no difference whether the inner profile of the tube is to form a nozzle or diaphragm. For example, if the differential pressure is measured with a Venturi nozzle, the insertion element can be designed in such a way as to comprise at least partial areas of the inlet profile and/or constriction and/or outlet profile. As a consequence, the insertion element can be used to adjust the tube to any cross sections and diameters.

It is also advantageous that the material and manufacturing process for the insertion element need not coincide with those for the carrier. Rather, it is possible to differentiate between the material and manufacturing process for the insertion element depending on the area of application. Therefore, conceivable applications include those in which the insertion element can consist of plastic, and is thus especially easy to manufacture. Other applications require an insertion element made out of metal, e.g., via CNC. In this regard, another underlying idea of this application relates to the insertion element according to the invention and its advantageous embodiment.

In a preferred embodiment, the carrier exhibits two channels that penetrate through the wall of the carrier, which are arranged one behind the other in the direction of flow of the medium. This embodiment of the carrier allows sensors arranged on the carrier to tap the pressure conditions prevailing at various sections of the tube, and thereby ascertain a differential pressure.

This embodiment is especially advantageous if a groove that runs around the outer surface of the insertion element is arranged between the insertion element and inner wall of the carrier, wherein the continuous groove on the one hand is connected with the interior of the insertion element that carries the flow of medium by a plurality of boreholes provided in the insertion element, and on the other hand is connected with one of the channels. A groove running around the outer surface of the insertion element in this way forms an annular chamber. Such annular chambers are used to be able to average out the pressure conditions prevailing at various locations on the periphery. Their use in differential pressure measurement along with the resultantly achieved advantages are generally known.

One significant difference relative to previously known annular chambers now lies in the fact that the annular chamber according to the invention is not arranged outside on the tube, but rather between the carrier and insertion element. This eliminates the otherwise required multiple channels through the tube wall, which connect the interior of the tube and the annular chamber. In addition, only channels that connect the sensors of the differential pressure gauge with the annular chamber or annular gap have to be standardized. All other dimensions can essentially be freely selected.

This also yields a special advantage to the method for fabricating a tube for measuring the differential pressure of a medium flowing through the tube. On the one hand, only an insertion element suitable for the given conditions must be selected, which is simply inserted into the carrier, which has been standardized to the greatest extent possible. In addition, the tube according to the invention is especially easy to put together. The insertion element need only be arranged laterally and coaxially to the carrier, and then introduced into the carrier. This insertion is already accompanied by the formation of the annular chamber, thus eliminating the need for a separate manufacturing step.

The groove according to the invention can here be designed in the inner wall of the carrier and/or in the outer wall of the insertion element. From a production standpoint, it is advantageous that the groove be provided in the outer wall of the insertion element. This surface is especially easy to reach for machining purposes. If the insertion element is fabricated via casting or similar molding processes, the groove can already be provided in the mold and can be molded simultaneously. Another advantage to the proposed annular chamber is thus that it can be fabricated by saving on material.

The groove preferably only runs around partial areas of the outer surface of the insertion element. The disadvantage to completely continuous annular chambers is that moisture present in the medium or condensate produced by temperature fluctuations accumulates at the lowest point of the annular chamber owing to gravity. Since there is no discharging capability there, a liquid reservoir forms over time. If the liquid reservoir freezes, the accompanying enlarged volume can damage or even destroy the annular chamber.

In order to reliably prevent this, the groove is designed as a circular arc. Such a groove forms an annular chamber that does not run completely around the outer profile of the insertion element. As a consequence, the groove runs in the circumferential direction between two ends spaced apart from each other. It is here especially advantageous for the circular arc formed in the groove to be downwardly aligned in the region of its two ends. The liquid then accumulates at both ends of the circular arc, and can again be discharged into the inner profile of the insertion element through a respective borehole located in this region. When assembling this insertion element in the tubular carrier, attention should thus be paid to the positioning of the incompletely continuous groove. Known measures can be taken to simplify positioning of the insertion element, for example markings or guide grooves.

Therefore, it is advantageous to provide several boreholes and adjust their position to the progression of the groove. This can be readily explained based on a preferred embodiment. The groove here forms a circular arc of 270°, and the insertion element is positioned in such a way that the lower 90° of the circumference are not run around by the groove. It here makes sense to provide at least two boreholes, of which each one of the ends of the circular arc is connected with the interior of the insertion element. For example, if four boreholes are provided and intended to be spaced uniformly apart, they form a kind of X-shape or a +-shape turned by 45°.

The circular arc shape can also be formed after the fact in a completely continuous groove, for example by casting or inserting an inlay into the no longer required portion of the groove. The same explanation provided for the term tubular applies to the term circular arc. In the sense of this application, the term circular arc shaped groove does not necessarily refer to a circular configuration, but rather to a groove that does not completely run around the circumference of the insertion element.

Especially advantageous is the plurality of boreholes in the insertion element, since various speeds can prevail at various locations of the tubular cross section, for example for reasons of tube geometry. Several boreholes uniformly distributed in particular in the circumferential direction average out the pressure prevailing in the annular chamber over the entire cross section.

It is advantageous in terms of measuring accuracy for the insertion element to be tightly sealed against the tubular carrier in the direction of flow before and/or after the continuous groove.

In an advantageous embodiment, a gasket that runs around the outer surface of the insertion element is provided on both sides of the continuous groove. On both sides means that the gaskets are situated before and after the groove in the direction of flow, and also completely run around the circular arc formed by the groove or the circumference of the insertion element. These gaskets arranged in particular parallel to the groove and having an annular design seal the annular chamber against regions of the interior with other pressure conditions, and thereby prevent a distortion of measuring results. As already explained for the groove, the fittings for the gasket can be formed in the inner wall of the carrier and/or in the outer wall of the insertion element. If the groove is shaped like a circular arc, it is advantageous that the ends of the circular arc also be completely sealed away from the regions of the interior with other pressure conditions, i.e., that the contour of the ends be completely encompassed by a gasket.

Alternatively or in combination, the continuous groove can also be sealed in another way. In another preferred embodiment, the tightness of the continuous groove is established at least partially by an integral connection between the carrier and insertion element. Depending on the selected material for the carrier and insertion element, it may be advantageous to establish the integral seal for the groove via adhesive bonding or ultrasonic welding.

It is especially advantageous for the insertion element to encompass a first and second continuous groove, wherein the first groove is joined with a first channel that penetrates through the wall of the carrier, and the second groove is joined with a second channel that penetrates through the wall of the carrier. Such an insertion element easily joins both the first and second channel with a respective annular chamber. The various acting pressures required for measuring the differential pressure can hereby be tapped without any elevated assembly efforts by way of a respective annular chamber.

Naturally, it is entirely conceivable to design the respective annular chambers via separate insertion elements, i.e., to provide a separate insertion element for each annular chamber. In particular, it can be provided that only one insertion element interact with one of the two channels. The other channel can be arranged before or after the insertion element in the direction of flow, and then joins the interior and differential pressure sensors in a previously known manner.

The insertion element can be fastened in the carrier in a variety of ways, for example by press fitting. In an especially advantageous embodiment, a partial region of the inner wall of the carrier forms a seat for the insertion element. As a result, the insertion element can be precisely inserted into the carrier at the required position without any major outlay. In particular, this greatly facilitates the positioning or adjustment of the insertion element.

BRIEF DESCRIPTION OF THE SEVERAL VIEWS OF THE DRAWING

An advantageous embodiment of the invention will be explained in more detail based on the longitudinal-sectional view shown in the FIGURE.

DESCRIPTION OF THE INVENTION

The FIGURE shows a section through a tube 1 according to the invention. Not depicted here are the fasteners, for example the flange, with which the tube 1 is integrated into a line system. The tube 1 encompasses a tubular carrier 2 and a tubular insertion element 3 arranged coaxially to the carrier 2. The insertion element 3 abuts against an inner wall 4 of the carrier 2. The inner profile 5 of the tube 1 is largely formed by the insertion element 3. The insertion element 3 forms an inlet profile 6 in the shape of a cone that tapers in the direction of flow, a constriction region 7 and in part an outlet profile 8, which continues at the end of the insertion element 3 in the carrier 2. The outlet profile 8 is shaped like a cone that opens in the direction of flow S, so that the tube 1 shown here forms a Venturi nozzle.

In the direction of flow S as viewed before the inlet profile 5, the insertion element 3 exhibits a plurality of radially running first boreholes 9, which are arranged on an axis 10 situated perpendicular to the direction of flow S. The boreholes 9 are located between the interior of the Venturi nozzle and a first groove 12 formed in the outer surface 11 of the insertion element 3, and join the latter together. The first groove 12 runs around the entire circumference of the insertion element 3. It thereby forms an annular chamber, whose radially outer boundary is formed by the inner wall 4 of the carrier 2. The annular chamber formed in this way exhibits an opening in the form of a first channel 13, which runs through the carrier 2 and makes it possible to connect the annular chamber with sensors of the flowmeter (not shown here). The sensors are preferably secured to the outer wall of the carrier. The groove 12 is sealed on either side by sealing rings 14 arranged between the inner wall 4 of the carrier and outer wall 11 of the insertion element 3. The sealing rings 14 each rest in an annular groove 15 formed in the outer wall 11 for this purpose.

In the region of the constriction 7, the insertion element 3 exhibits a plurality of radially running second boreholes 16, which also are situated along an axis 17 arranged perpendicularly to the direction of flow S. The second boreholes 16 empty into a second groove 18, which is designed analogously to the first groove 12, i.e., one according to the second annular chamber. In like manner, the groove 18 has allocated to it corresponding gaskets 19, which are fitted into annular grooves 20. The second annular chamber can also be connected with the already mentioned sensors of the differential pressure gauge by way of a second channel 21 that runs through the carrier 2.

The inner wall 4 of the carrier 2 and outer wall 11 of the insertion element 3 exhibit an at least approximately radially arranged partial region, which forms a seat 22 for the insertion element 3.

The invention claimed is:

1. A tube for measuring the differential pressure of a medium flowing through the tube, the tube comprising:
    an inner profile of the tube;
    a tubular carrier having a wall with an inner wall surface; and
    a tubular insertion element disposed on said inner wall surface of said tubular carrier, said tubular insertion element forming at least partial regions of said inner profile; and
    two channels penetrating through said wall of said tubular carrier, said two channels being disposed one behind the other in a direction of flow of the medium;
    said tubular insertion element having an interior carrying a flow of the medium, an outer surface, and a continuous groove running around said outer surface of said tubular insertion element;
    said continuous groove being disposed between said tubular insertion element and said inner wall surface of said tubular carrier;
    said continuous groove being connected with said interior of said tubular insertion element by a plurality of boreholes provided in said tubular insertion element; and
    said continuous groove being connected with one of said two channels.

2. The tube according to claim 1, wherein said continuous groove has a shape of a circular arc.

3. The tube according to claim 2, wherein said circular arc formed by said continuous groove has two ends and is downwardly aligned in a vicinity of said two ends.

4. The tube according to claim 1, wherein said tubular insertion element is sealed against said tubular carrier at least one of before or after said continuous groove in said direction of flow.

5. The tube according to claim 4, which further comprises gaskets running around said outer surface of said tubular insertion element on both sides of said continuous groove.

6. The tube according to claim 4, which further comprises an integral connection between said tubular carrier and said insertion element establishing a tightness of said continuous groove.

7. The tube according to claim 1, wherein said continuous groove is formed in said outer wall surface of said tubular insertion element.

8. The tube according to claim 1, wherein:
    said continuous groove of said tubular insertion element is a first continuous groove;
    said tubular insertion element includes a second continuous groove;
    said two channels penetrating through said wall of said tubular carrier are first and second channels;
    said first groove is joined with said first channel; and
    said second groove is joined with said second channel.

9. The tube according to claim 1, wherein said inner wall surface of said tubular carrier has a partial region forming a seat for said tubular insertion element.

10. A tubular insertion element to be disposed on an inner wall surface of a tubular carrier, the tubular insertion element comprising:
    at least partial regions of an inner profile of a tube for measuring a differential pressure of a medium flowing through the tube;
    two channels penetrating through said wall of said tubular carrier, said two channels being disposed one behind the other in a direction of flow of the medium;
    said tubular insertion element having an interior carrying a flow of the medium, an outer surface, and a continuous groove running around said outer surface of said tubular insertion element;
    said continuous groove being disposed between said tubular insertion element and said inner wall surface of said tubular carrier;
    said continuous groove being connected with said interior of said tubular insertion element by a plurality of boreholes provided in said tubular insertion element; and
    said continuous groove being connected with one of said two channels.

11. A method for fabricating a tube for measuring the differential pressure of a medium flowing through the tube, the method comprising the following steps:
    aligning a tubular insertion element coaxially with a tubular carrier; and
    then introducing the insertion element into the tubular carrier to place the tubular insertion element on an inner wall surface of the tubular carrier and to form at least partial regions of an inner profile of the tube inside the tubular insertion element;
    to form a tube having:
    an inner profile of the tube;
    a tubular carrier having a wall with an inner wall surface; and
    a tubular insertion element disposed on said inner wall surface of said tubular carrier, said tubular insertion element forming at least partial regions of said inner profile; and two channels penetrating through said wall of said tubular carrier, said two channels being disposed one behind the other in a direction of flow of the medium;

said tubular insertion element having an interior carrying a flow of the medium, an outer surface, and a continuous groove running around said outer surface of said tubular insertion element;

said continuous groove being disposed between said tubular insertion element and said inner wall surface of said tubular carrier;

said continuous groove being connected with said interior of said tubular insertion element by a plurality of boreholes provided in said tubular insertion element; and said continuous groove being connected with one of said two channels.

12. The tube according to claim 2, wherein said circular arc of said continuous groove is an arc of 270 degrees, and said insertion element is positioned in such a way that the lower 90 degrees of the circumference are not run around by said continuous groove.

13. The tube according to claim 2, which comprises at least two boreholes, of which each one of the ends of the circular arc is connected with the interior of the insertion element.

* * * * *